US009839293B2

(12) United States Patent
Qiu

(10) Patent No.: US 9,839,293 B2
(45) Date of Patent: Dec. 12, 2017

(54) ROLLING-AND-SWINGING DEVICE AND MASSAGE CHAIR CONTAINING THE SAME

(71) Applicant: Bingshun Qiu, Xiamen (CN)

(72) Inventor: Bingshun Qiu, Xiamen (CN)

( * ) Notice: Subject to any disclaimer, the term of this patent is extended or adjusted under 35 U.S.C. 154(b) by 720 days.

(21) Appl. No.: 14/499,260

(22) Filed: Sep. 29, 2014

(65) Prior Publication Data

US 2015/0015040 A1 Jan. 15, 2015

Related U.S. Application Data

(63) Continuation-in-part of application No. PCT/CN2013/000240, filed on Mar. 7, 2013.

(30) Foreign Application Priority Data

Apr. 13, 2012 (CN) .......................... 2012 1 0107648

(51) Int. Cl.
| | | |
|---|---|---|
| *A47C 3/029* | (2006.01) | |
| *A61H 1/00* | (2006.01) | |
| *A47C 1/02* | (2006.01) | |
| *A47C 7/50* | (2006.01) | |
| *A47C 7/54* | (2006.01) | |
| *F16H 21/40* | (2006.01) | |
| *A47D 9/02* | (2006.01) | |

(52) U.S. Cl.
CPC ................ *A47C 3/029* (2013.01); *A47C 1/02* (2013.01); *A47C 7/506* (2013.01); *A47C 7/54* (2013.01); *A61H 1/003* (2013.01); *F16H 21/40* (2013.01); *A47D 9/02* (2013.01); *A61H 2201/0149* (2013.01); *A61H 2201/5038* (2013.01); *A61H 2201/5092* (2013.01); *Y10T 74/18056* (2015.01)

(58) Field of Classification Search
CPC .. A47C 3/029; A47C 3/02; A47C 1/02; A47C 1/003; A47C 7/54; A47C 7/506; A61H 1/003; F16H 21/40
See application file for complete search history.

(56) References Cited

U.S. PATENT DOCUMENTS

| | | | | |
|---|---|---|---|---|
| 2001/0027135 A1* | 10/2001 | Lawson | ................... | A63G 9/16 |
| | | | | 472/119 |
| 2011/0059806 A1* | 3/2011 | Qiu | ...................... | A47C 3/0255 |
| | | | | 472/119 |

FOREIGN PATENT DOCUMENTS

CN          101172003 A  *  5/2008

OTHER PUBLICATIONS

EPO Patent Translate, Translation of CN101172003, EPO, pp. 1-15.*

* cited by examiner

*Primary Examiner* — Justine Yu
*Assistant Examiner* — Timothy Stanis
(74) *Attorney, Agent, or Firm* — Wayne & King LLC

(57) ABSTRACT

The present invention discloses a rolling-and-swinging device and a massage chair. The rolling-and-swinging device comprises a gear motor, a motor mounting plate, a torque output board, a swing arm, a swing arm synchronizer ring, a damping ring, an optical shutter rotating ring, a swinging monitoring controller, a microcomputer controller, a shaft supporting plate, a frame and curved legs. The massage chair is for commercial sale, wherein the massage chair is equipped with aforementioned rolling-and-swinging device and two curved legs in contact with the ground, and the operation of the rolling and swinging motion of the massage chair is automatic. This invention is characterized by having a simple structure, and being able to operate reliably, low in energy consumption, quiet, and widely applicable.

10 Claims, 9 Drawing Sheets

ROLLING-AND-SWINGING DEVICE AND MASSAGE CHAIR CONTAINING THE SAME

CROSS-REFERENCE TO RELATED APPLICATIONS

This application is a continuation-in-part of International Patent Application No. PCT/CN2013/000240 with an international filing date of Mar. 7, 2013, designating the United States, now pending, and further claims priority benefits to Chinese Patent Application No. 201210107648.X filed Apr. 13, 2012. The contents of all of the aforementioned applications, including any intervening amendments thereto, are incorporated herein by reference.

BACKGROUND OF THE INVENTION

1. Field of the Invention

The invention relates to a recreational product and, more particularly, relates to a rolling-and-swinging device and a massage chair containing the same. The rolling-and-swinging device of the invention is able to be utilized in fields which require a device, e.g., an automatic rocking chair, for simulating natural rolling and swinging.

2. Description of the Related Art

A conventional swinging device usually comprises a gear motor combined with an electromagnetic clutch. There are several problems with such swinging device, including complex structure and possible malfunction of the electromagnetic clutch.

SUMMARY OF THE INVENTION

In view of the above-described problem, it is one objective of the invention to provide a rolling-and-swinging device which uses a gear motor as an energy source. The rolling-and-swinging device is of a simple, compact structure without redundant components, and is capable of working reliably with less energy consumption and less noise. The rolling-and-swinging device of the invention has a wide range of applications in different fields.

To achieve the above objectives, in accordance with one embodiment of the invention, provided is a rolling-and-swinging device, comprising a gear motor, a motor mounting plate, a torque output board, a swing arm, a swing arm synchronizer ring, a damping ring, an optical shutter rotating ring, a swinging monitoring controller, a microcomputer controller, a shaft supporting plate, a frame, and curved legs.

In a class of this embodiment, the gear motor is screwed to the motor mounting plate and is connected to the microcomputer controller.

In a class of this embodiment, the torque output board is firmly screwed to the shaft of the gear motor. The torque output board is in a Short "U" shape with a low height. The two protruding ends of the torque output board is arranged on the lateral sides of the swing arm; elastic cushions are provided on the two protruding ends for cushioning the swing arm and reducing noise.

In a class of this embodiment, the swing arm is in an L shape. One leg of the L-shaped swing arm comprises a ball bearing which is fitted with the shaft of the gear motor. The other leg of the L-shaped swing arm comprises a wheel in contact with the ground.

In a class of this embodiment, the swinging monitoring controller comprises a fixed portion and a rotatable portion. The rotatable portion comprises the swing arm synchronizer ring, the damping ring, and the optical shutter rotating ring; the fixed portion comprises a photoelectric switch support, a baffle plate, and a photoelectric switch.

In a class of this embodiment, the swing arm synchronizer ring is connected to the swing arm via welding, rivets, or screws. The axis of the swing arm synchronizer ring and the axis of the shaft of the gear motor are superimposed and there is a clearance between the swing arm synchronizer ring and the shaft of the gear motor.

In a class of this embodiment, the damping ring is disposed on the outer circumference of the swing arm synchronizer ring.

In a class of this embodiment, the optical shutter rotating ring is disposed on the outer circumference of the damping ring.

In a class of this embodiment, the photoelectric switch support of the swinging monitoring controller is screwed to the shaft supporting plate. The photoelectric switch and the baffle plate are to the photoelectric switch support via screws. The photoelectric switch is connected to the microcomputer controller.

In a class of this embodiment, a ball bearing is disposed on the shaft supporting plate and supports the shaft of the gear motor.

In a class of this embodiment, the motor mounting plate and the shaft supporting plate are connected to the frame via welding, rivets, or screws.

In a class of this embodiment, the frame is connected to the curved legs via welding, rivets, or screws.

In a class of this embodiment, the curved legs are in a number at least of two.

In a class of this embodiment, the microcomputer controller comprises a microprocessor, a signal input port, a power input port, a wireless signal receiver modulus, and an energy-and-time-controlling output port. The gear motor and the photoelectric switch are connected to the microcomputer controller.

In a class of this embodiment, the damping ring disposed on the outer circumference of the swing arm synchronizer ring is made of polymer materials. The photoelectric switch support on which the photoelectric switch and the baffle plate are disposed is connected to the shaft supporting plate. The emitter and receiver of the photoelectric switch and the baffle plate form an enclosed space. The optical shutter is disposed inside the enclosed space and its rotation causes the photoelectric switch to be activated or deactivated.

In a class of this embodiment, the signal input port of the microcomputer controller receives the signal from the photoelectric switch, a keyboard, or the wireless signal receiver modules and transmits the signal to the microprocessor. By processing the signal from the signal input port and executing a program which compares the length of time with preset values, the microprocessor controls the energy-and-time-controlling output port via an electric switch to turn on or off the gear motor.

The invention also relates to a massage chair, which comprises the components of a conventional massage chair including a cushion, a back, armrests, a footrest, a frame that connects the aforementioned components, leather-coated massage devices, mechanisms for adjusting the angles of the back and the footrest, and a controller. The massage chair of the invention further comprises two curved legs and a rolling-and-swinging device disposed on the frame.

Advantages of the invention include the following: the rolling-and-swinging device of the invention does not contain an electromagnetic clutch and has a rolling-direction controller of simple structure, which achieves a low manufacturing cost, high reliability, less noise, compact structure, and low energy consumption;

In addition, the massage chair containing the rolling-and-swinging device has the following advantages: The utility of the massage function of a conventional massage chair is limited in order to prevent the user from accepting excessive massage that may cause adverse effects to the user's health. The rolling-and-swinging device of the invention allows the massage chair to perform massage function and swinging function at the same time, and also allows the massage chair to perform swinging function only. Therefore, the massage chair becomes a bi-functional device. It functions as a physiotherapeutic device when performing massage function and functions as a recreational device when performing swinging function. Compared with a conventional massage chair, the massage chair of the invention has an expanded application range since when the massage function is not need, it is still able to work as a recreational swinging chair.

BRIEF DESCRIPTION OF THE DRAWINGS

Detailed description will be given below in conjunction with accompanying drawings, in which.

DETAILED DESCRIPTION OF THE EMBODIMENTS

Figure 1:
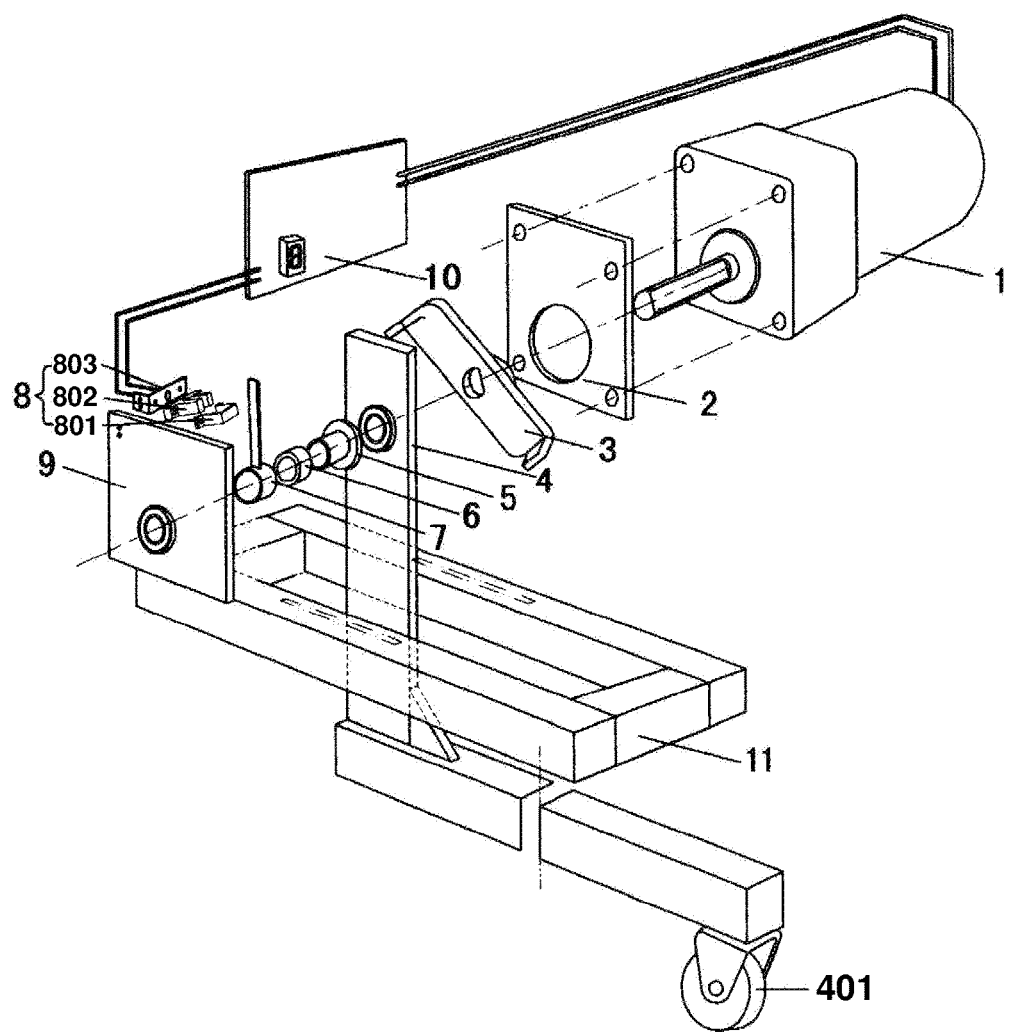
FIG. 1 is an exploded view of a rolling-and-swinging device of an exemplary embodiment of the invention.
Figure 2:
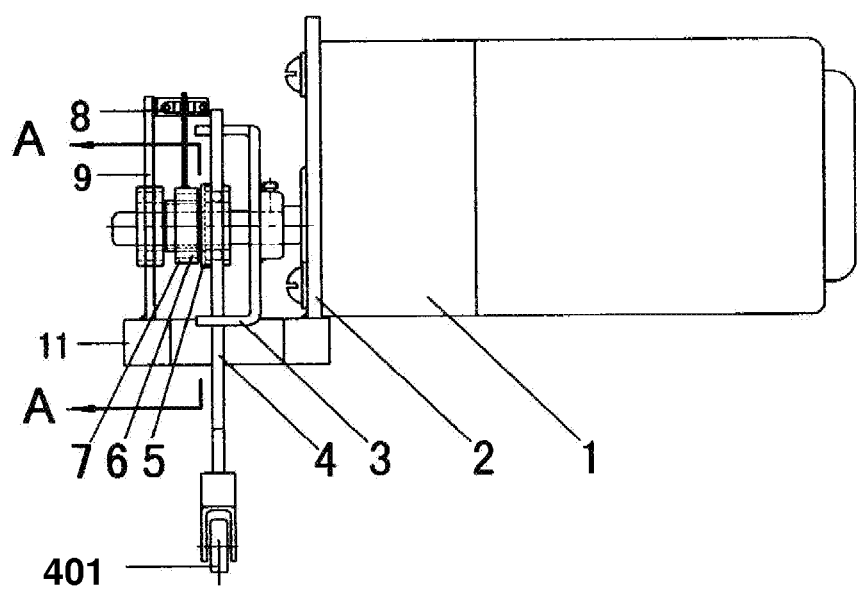
FIG. 2 is a front view of a rolling-and-swinging device of an exemplary embodiment of the invention.
Figure 3:
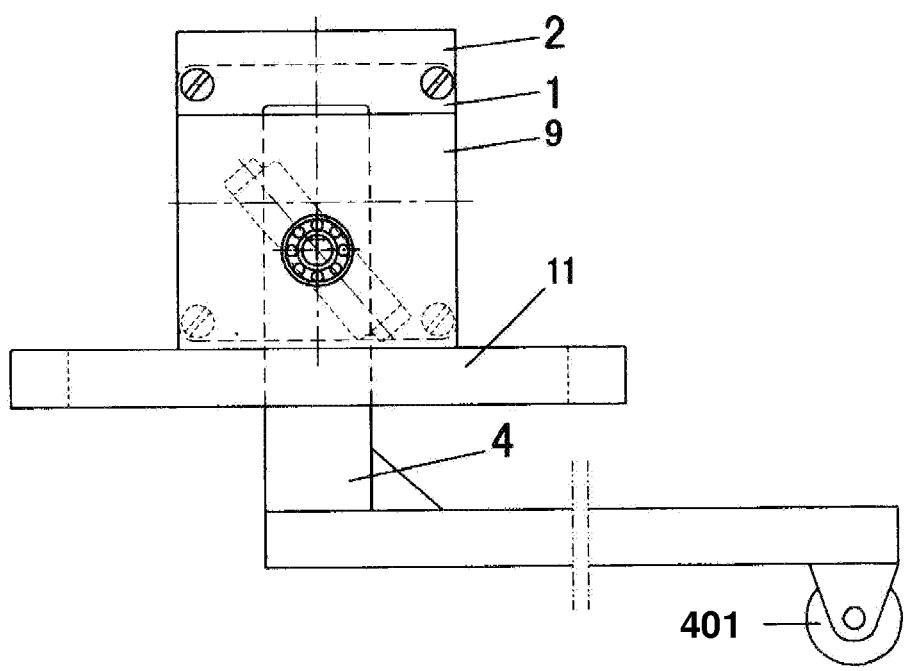
FIG. 3 is a side view of a rolling-and-swinging device in FIG. 2.
Figure 4:
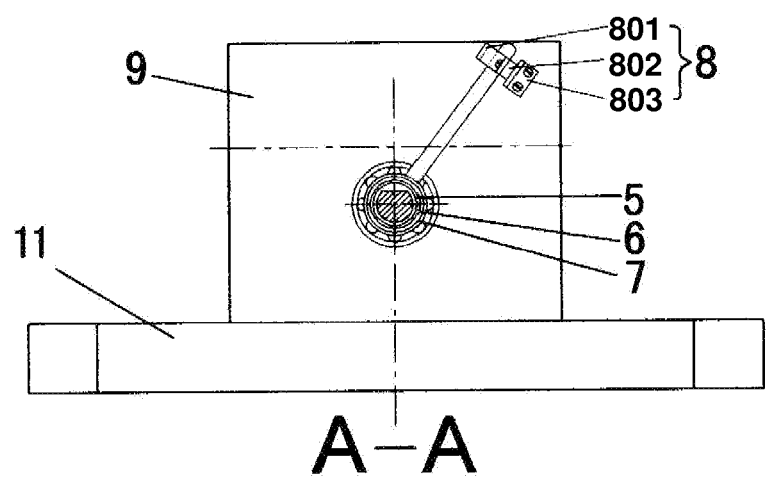
FIG. 4 is a cross-sectional view of a rolling-and-swinging device along an A-A line in FIG. 2.
Figure 5:
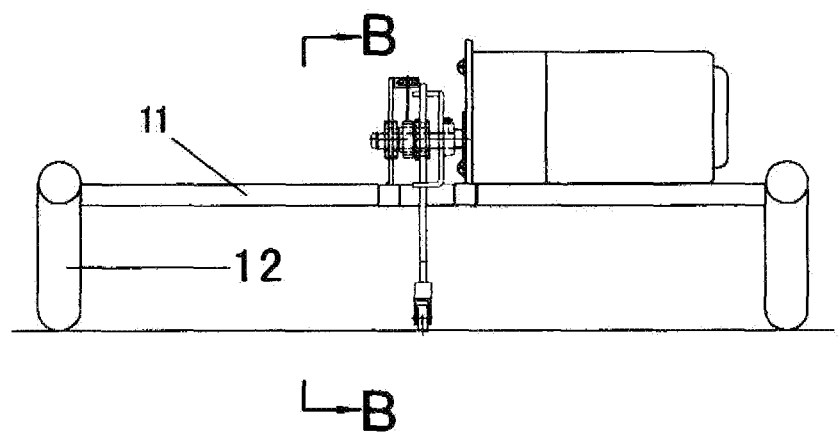
FIG. 5 is a front view of a rolling-and-swinging device disposed on curved legs.
Figure 6:
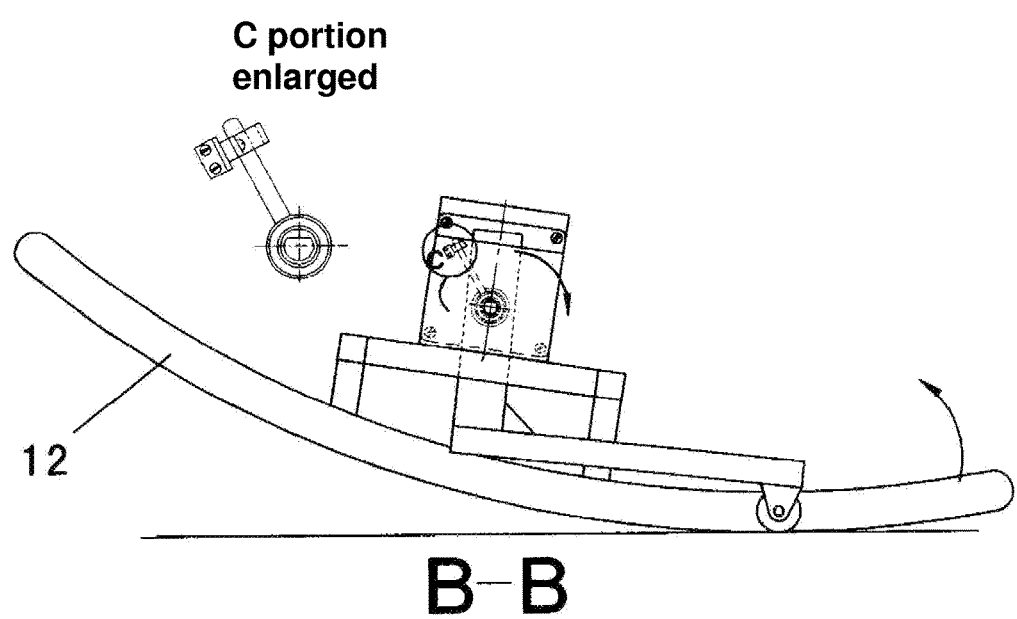
FIG. 6 is a cross-sectional view of a rolling-and-swinging device along an B-B line in FIG. 5 as the motor is on to drive the chair.
Figure 7:
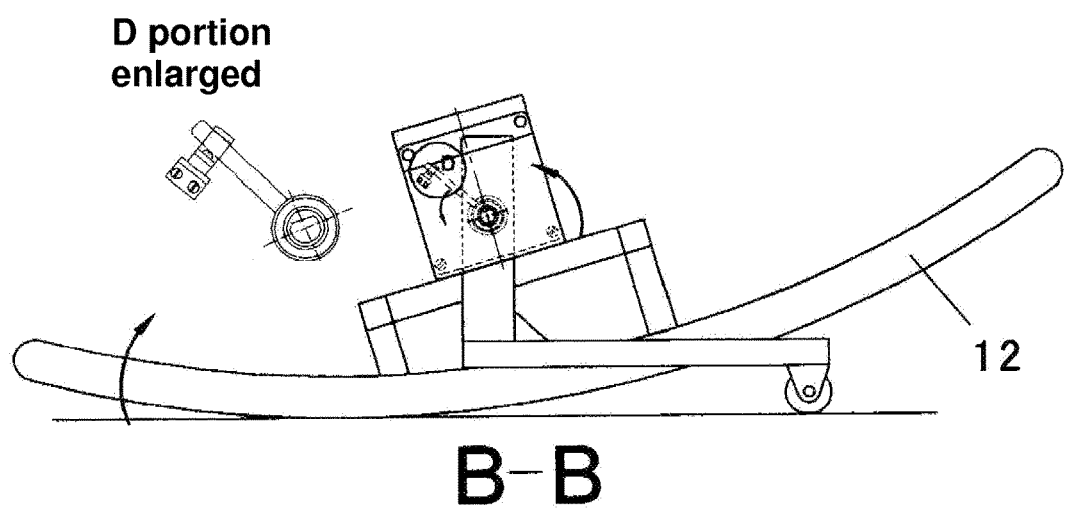
FIG. 7 is a cross-sectional view of a rolling-and-swinging device along an B-B line in FIG. 5 as the motor is off.
Figure 8:
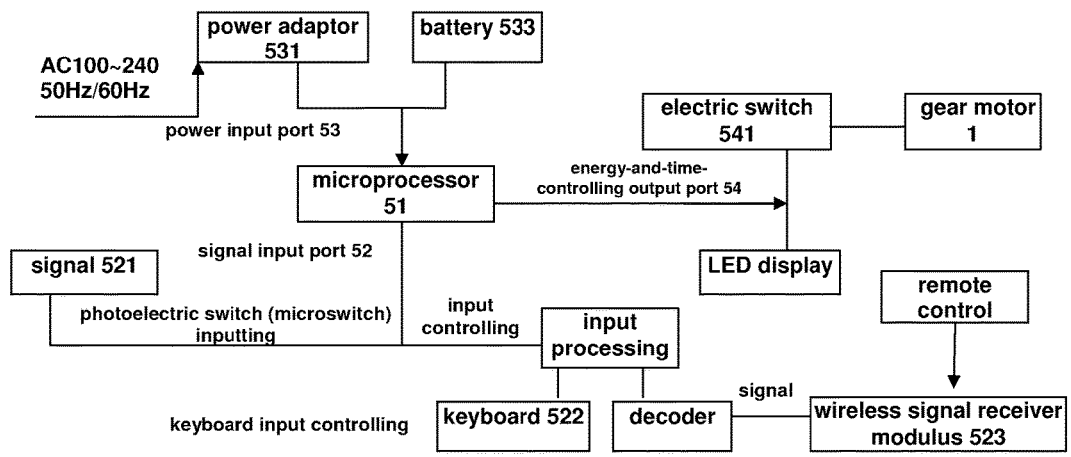
FIG. 8 is a schematic view of a microcomputer controller 9.
Figure 9:
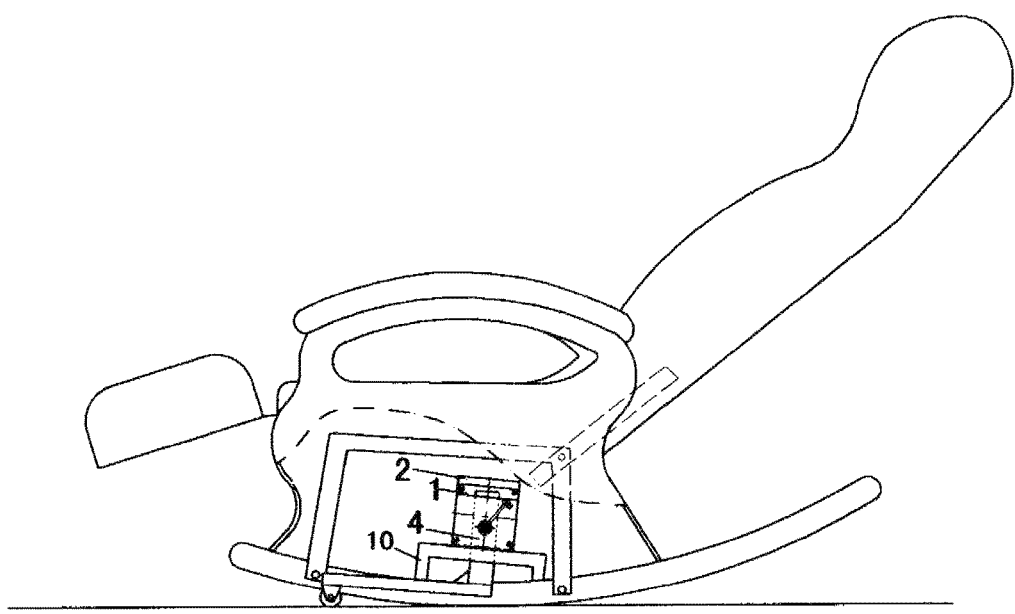
FIG. 9 is a side view of a rolling-and-swinging device disposed on a massage chair.

As shown in FIGS. 1-8, a rolling-and-swinging device of the invention comprises a gear motor 1, a motor mounting plate 2, a torque output board 3, a swing arm 4, a swing arm synchronizer ring 5, a damping ring 6, an optical shutter rotating ring 7, a swinging monitoring controller 8, a shaft supporting plate 9, a microcomputer controller 10, a frame 11, and curved legs 12. The gear motor 1 is connected to the motor mounting plate 2 via screws. The torque output board 3 is connected to the shaft of the gear motor 1 via screws. The bore of the ball bearing on the swing arm 4 is fitted with the shaft of the gear motor 1 via interference-fit. The swing arm synchronizer ring 5 is connected to the swing arm 4 via welding, rivets, or screws. The axis of the swing arm synchronizer ring 5 and the axis of the shaft of the gear motor 1 are superimposed and there is a clearance between the swing arm synchronizer ring 5 and the shaft of the gear motor 1. The damping ring 6 is disposed on the outer circumference of the swing arm synchronizer ring 5. The optical shutter rotating ring 7 is disposed on the outer circumference of the damping ring 6. The photoelectric switch support 803 of the swinging monitoring controller 8 is connected to the shaft supporting plate 9 via screws. The photoelectric switch 802 and the baffle plate 801 are connected to the photoelectric switch support 803 via screws. The shaft of the gear motor 1 is disposed in the bore of the ball bearing disposed on the shaft supporting plate 9 via interference-fit. The motor mounting plate 2 and the shaft supporting plate 9 are connected to the frame 11 via welding, rivets, or screws. The frame 11 is connected to the curved legs 12 via welding, rivets, or screws.

Operation principle of the invention is as follows: When the rolling-and-swinging device of the invention is connected to a power source, the carrier on the curved legs 12 is pushed manually to start swinging. The wheel 401 presses on the swing arm 4 to form an angle with the ground so as to rotate the swing arm 4. The swing arm synchronizer ring 5 rotates synchronously with the swing arm 4 to drive the damping ring 6 and the optical shutter rotating ring 7 to rotate. The optical shutter rotating ring 7 rotates the optical shutter to activate the photoelectric switch 802. The photoelectric switch 802 sends a signal to the microcomputer controller 10. The microcomputer controller 10 turns on the gear motor 1 so that the gear motor rotates clockwise. The torque output board 3 rotates in company with the gear motor 1 and drives the swing arm 4 to rotate so that the wheel 401 on the swing arm 4 presses the ground and generates a reserve force on the motor mounting plate 2 and the shaft supporting plate 9. This reserve force is transmitted through the frame 11 to the curved legs 12 and the carrier thereon so that the curved legs 12 roll on the ground. When the microcomputer controller 10 turns on the gear motor 1, the microprocessor of the microcomputer controller 10 starts to time. When the length of the time reaches a preset value in the program, the microcomputer controller 10 turns off the gear motor 1. After the gear motor 1 is turned off, the curved legs 12 and the carrier thereon still keep rolling forward due to inertia thereof. After all of the kinetic energy of the curved legs 12 and the carrier thereon transforms into potential energy, the curved legs 12 and the carrier thereon stop rolling forward and start to roll backward. At this time, the wheel 401 on the swing arm 4 pushes the swing arm 4 to rotate in a reverse direction. The swing arm 4 and the swing arm synchronizer ring 5 drive the damping ring 6 and the optical shutter rotating ring 7 to rotate in the reverse direction so that the optical shutter is rotated backward by the optical shutter rotating ring 7 to deactivate the optical switch. When the backward swing of the curved legs changes to the forward swing, the wheel 401 on the swing arm 4 forms an angle with the ground to rotate the swing arm 4. The swing arm synchronizer ring 5 and the swing arm 4 rotate synchronously to drive the damping ring 6 and the optical shutter rotating ring 7 so that the optical shutter rotating ring 7 rotates the optical shutter to activate the photoelectric switch again. As such, the swinging process is repeated continuously.

The optical shutter is disposed inside the enclosed space formed by the emitter and receiver of the photoelectric switch 802 and the baffle plate 801. When the optical shutter rotating ring 7 is not blocked, the optical shutter rotates with the optical shutter rotating ring 7; when the optical shutter rotating ring 7 is blocked, the optical shutter slides between the optical shutter rotating ring 7 and the damping ring 6.

Operation principle of the microcomputer controller 10 is as follows: When the microcomputer controller 10 receives a high-level signal or low-level signal from the optical switch 802, the program decides which signal is used as the activating signal of the microprocessor. After the microprocessor turns on the electric switch to turn on the gear motor 1, the microprocessor times and then turns off the electric switch to turn off the gear motor 1 when the length of the time that the gear motor 1 is on reaches a preset length of time in the program. The length of time that the gear motor 1 is on determines the magnitude of the swing of the curved legs 12. The microcomputer controller 10 further comprises a keyboard, a wireless signal receiver modulus, and a LED display. The length of time that the gear motor 1 is on is able to be changed by inputting data through the keyboard or the wireless signal receiver modulus so as to change the magnitude of the swing of the curved legs 12. The LED display shows the working data of the device.

A massage chair of the invention comprises a cushion, a back, armrests, a footrest, a frame for the aforementioned components, leather-coated massage devices, mechanisms for adjusting the angles of the back and the footrest, and a controller. The massage chair of the invention further comprises two curved legs 12 and a rolling-and-swinging device disposed on the frame. The wheel 401 on the swing arm 4 forms an angle with the ground to push the swing arm 4.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A rolling-and-swinging device, comprising:
a gear motor;
a motor mounting plate;
a torque output board;
a swing arm;
a swing arm synchronizer ring;
a damping ring;
an optical shutter rotating ring;
a swinging monitoring controller, comprising a fixed portion;
a microcomputer controller;
a shaft supporting plate;
a frame; and
curved legs
wherein
the gear motor is connected to the motor mounting plate via screws;
the torque output board is firmly connected to a shaft of the gear motor;
the swing arm is placed on the shaft of the gear motor, wherein the shaft of the gear motor is configured to rotate relative to the swing arm;
the swing arm synchronizer ring is firmly connected to the swing arm;
the damping ring is arranged on an outer circumference of the swing arm synchronizer ring;
the optical shutter rotating ring is arranged on an outer circumference of the damping ring;
the fixed portion of the swinging monitoring controller is screwed to the shaft supporting plate;
the shaft supporting plate is attached to the shaft of the gear motor, wherein the shaft of the gear motor is configured to rotate relative to the shaft supporting plate;
the motor mounting plate and the shaft supporting plate are firmly connected to the frame;
the frame is connected to the curved legs;
a photoelectric switch, the gear motor and the microcomputer controller are connected; and
the microcomputer controller is configured to control the gear motor to be on or off.

2. The rolling-and-swinging device of claim 1, wherein the torque output board has a short "U" shape;
two protruding ends of the torque output board arranged on both sides of the swing arm are configured to transmit torque of the gear motor to the swing arm; and
elastic cushions are provided on the two protruding ends for cushioning the swing arm and reducing noise.

3. The rolling-and-swinging device of claim 1, wherein the swing arm and shaft of the gear motor are connected with a ball bearing; and
the swing arm comprises a wheel at an end of the swing arm, wherein the wheel is in contact with the ground when in use.

4. The rolling-and-swinging device of claim 1, wherein an axis of the swing arm synchronizer ring and an axis of the shaft of the gear motor are superimposed; and
a gap exists between the swing arm synchronizer ring and the shaft of the gear motor.

5. The rolling-and-swinging device of claim 1, wherein the damping ring is configured to damp the swing arm synchronizer ring and the optical shutter rotating ring with friction.

6. The rolling-and-swinging device of claim 1, wherein the fixed portion of the swinging monitoring controller comprises a photoelectric switch support, a baffle plate, and a photoelectric switch;
the photoelectric switch support is screwed to the shaft supporting plate; and
the photoelectric switch and the baffle plate are screwed to the photoelectric switch support.

7. The rolling-and-swinging device of claim 1, wherein a ball bearing is installed on the shaft supporting plate and is fitted with the shaft of the gear motor.

8. The rolling-and-swinging device of claim 1, wherein when in use, the microcomputer controller is configured to receive signals from the photoelectric switch, a wireless signal receiver modulus and a keyboard.

9. The rolling-and-swinging device of any one of claims 1, 6, and 8, wherein
the photoelectric switch is a magnetic switch, a micro switch, or a sensor switch.

10. A massage chair, comprising:
a cushion;
an adjustable back;
armrests;
an adjustable footrest;
a frame connecting the cushion, adjustable back, armrests and adjustable footrest;
leather-coated massage devices;
a controller; and
the rolling-and-swinging device of claim 1; wherein
two curved legs are in contact with the ground, and
automatic operation of the rolling and swinging motion of the massage chair is electrically driven.

* * * * *